United States Patent
Nakao et al.

(10) Patent No.: US 8,144,563 B2
(45) Date of Patent: Mar. 27, 2012

(54) INFORMATION RECORDING MEDIUM, REPRODUCING DEVICE AND REPRODUCING METHOD

(75) Inventors: Masahito Nakao, Osaka (JP); Yasumori Hino, Nara (JP); Yoshiaki Komma, Osaka (JP); Fumitomo Yamasaki, Nara (JP); Kousei Sano, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/936,939

(22) PCT Filed: Dec. 3, 2009

(86) PCT No.: PCT/JP2009/006607
§ 371 (c)(1),
(2), (4) Date: Oct. 8, 2010

(87) PCT Pub. No.: WO2010/067555
PCT Pub. Date: Jun. 17, 2010

(65) Prior Publication Data
US 2011/0032805 A1    Feb. 10, 2011

(30) Foreign Application Priority Data
Dec. 10, 2008  (JP) ................ 2008-314493

(51) Int. Cl.
G11B 7/00   (2006.01)
G11B 7/24   (2006.01)

(52) U.S. Cl. ............... 369/94; 369/275.1

(58) Field of Classification Search ........ 369/94, 369/275.3, 275.4, 275.1, 13.39–13.41, 103, 369/13.53
See application file for complete search history.

(56) References Cited

U.S. PATENT DOCUMENTS

| | | | |
|---|---|---|---|
| 5,677,903 A * | 10/1997 | Holtslag et al. | 369/94 |
| 7,522,496 B2 | 4/2009 | Lee | |
| 7,801,000 B2 | 9/2010 | Noda et al. | |
| 7,826,333 B2 * | 11/2010 | Mishima et al. | 369/94 |
| 2005/0013216 A1 | 1/2005 | Kim et al. | |
| 2005/0094507 A1 | 5/2005 | Ogasawara | |
| 2006/0038875 A1 | 2/2006 | Ichimura | |
| 2006/0203680 A1 * | 9/2006 | Hong et al. | 369/94 |
| 2006/0228531 A1 | 10/2006 | Iwasa et al. | |

(Continued)

FOREIGN PATENT DOCUMENTS

JP    2003-036561    2/2003

(Continued)

OTHER PUBLICATIONS

Co-pending U.S. Appl. No. 12/634,042, filed Dec. 9, 2009.

(Continued)

*Primary Examiner* — Thang Tran
(74) *Attorney, Agent, or Firm* — Renner, Otto, Boisselle & Sklar, LLP

(57) ABSTRACT

An information recording medium according to the present invention includes at least three information recording layers. If the readout power of a laser beam in reading information from an information recording layer L(n) is identified by Pw(n), and if the readout power of the laser beam in reading information from an information recording layer L(n+a) is identified by Pw(n+a), then a base thickness between the information recording layers is determined so that the intensity of the light when the information recording layer L(n+a) is irradiated with a laser beam having the readout power Pw(n) becomes equal to or lower than that of the light when the information recording layer L(n+a) is irradiated with a laser beam having the readout power Pw(n+a).

4 Claims, 7 Drawing Sheets

U.S. PATENT DOCUMENTS

| | | | |
|---|---|---|---|
| 2008/0043602 A1* | 2/2008 | Nishikiori et al. | 369/275.1 |
| 2008/0062244 A1* | 3/2008 | Wu et al. | 369/94 |
| 2008/0170485 A1* | 7/2008 | Mishima et al. | 369/100 |
| 2008/0175124 A1* | 7/2008 | Kikukawa et al. | 369/94 |
| 2009/0034388 A1* | 2/2009 | Nakano et al. | 369/94 |
| 2009/0086602 A1* | 4/2009 | Ushiyama et al. | 369/94 |
| 2010/0208563 A1 | 8/2010 | Nakao et al. | |

FOREIGN PATENT DOCUMENTS

| | | |
|---|---|---|
| JP | 2004-342283 | 12/2004 |
| JP | 2005-122862 | 5/2005 |
| JP | 2006-040456 | 2/2006 |

OTHER PUBLICATIONS

International Search Report for corresponding International Application No. PCT/JP2009/006607 mailed Feb. 9, 2010.

Form PCT/ISA/237 for corresponding International Application No. PCT/JP2009/006607 mailed Feb. 9, 2010 and partial English translation.

Blu-ray Disc Reader (Blu-ray Handbook), published by Ohmsha, Ltd., pp. 13-28 with a concise explanation.

White paper, Blu-ray Disc Format, General, Aug. 2004, pp. 1-37.

White paper, Blu-ray Disc Format, 3. File System Specifications for BD-RE, R, ROM, Aug. 2004, pp. 1-6.

White paper, Blu-ray Disc Format, 4. Key Technologies, Aug. 2004, pp. 1-8.

International Search Report for corresponding International Application No. PCT/JP2009/006608 mailed Feb. 9, 2010.

Form PCT/ISA/237 for corresponding International Application No. PCT/JP2009/006608 mailed Feb. 9, 2010 and partial English translation.

* cited by examiner

FIG.4
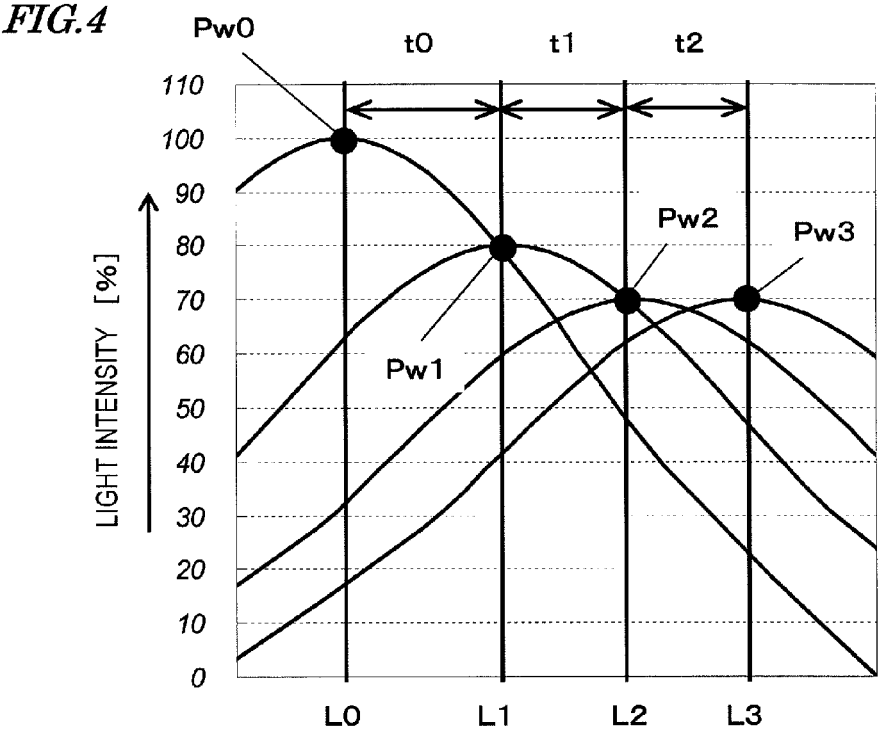
FIG.5  $S = -0.1238 \times d^2 - 2.772 \times d + 106.56$
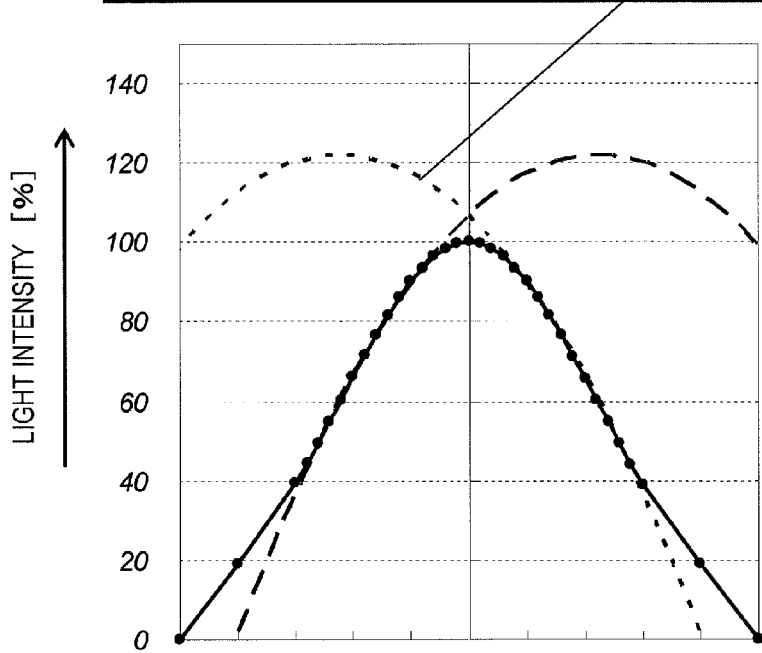

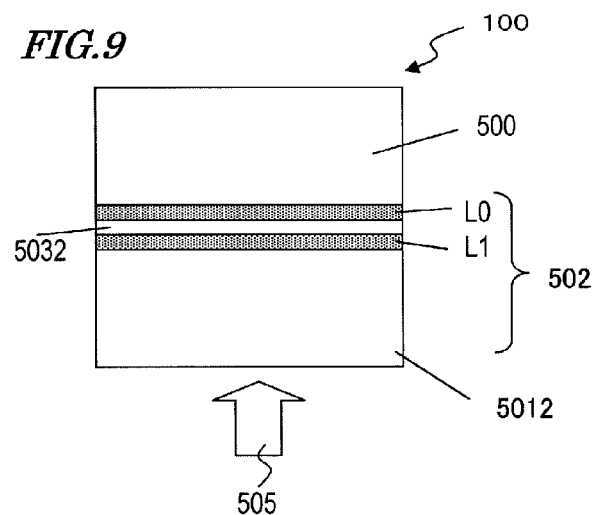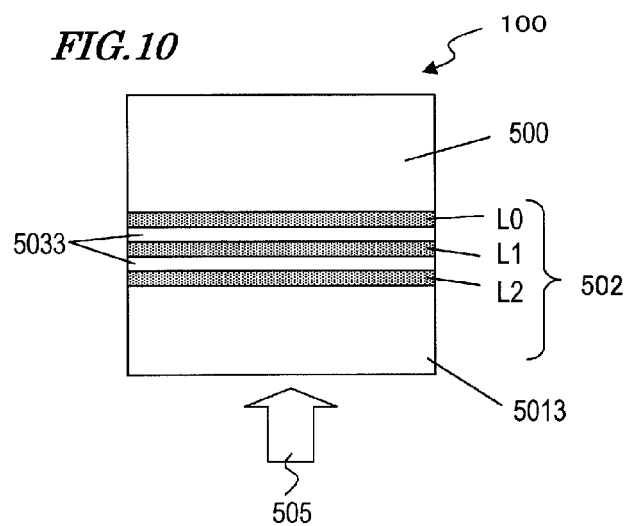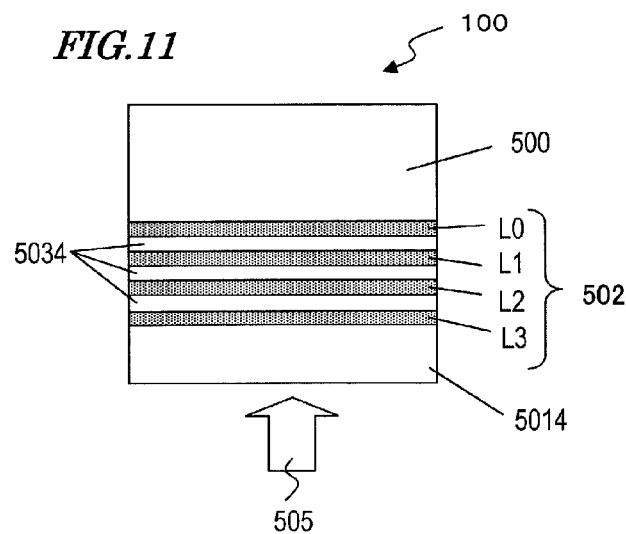

FIG.13
(a)
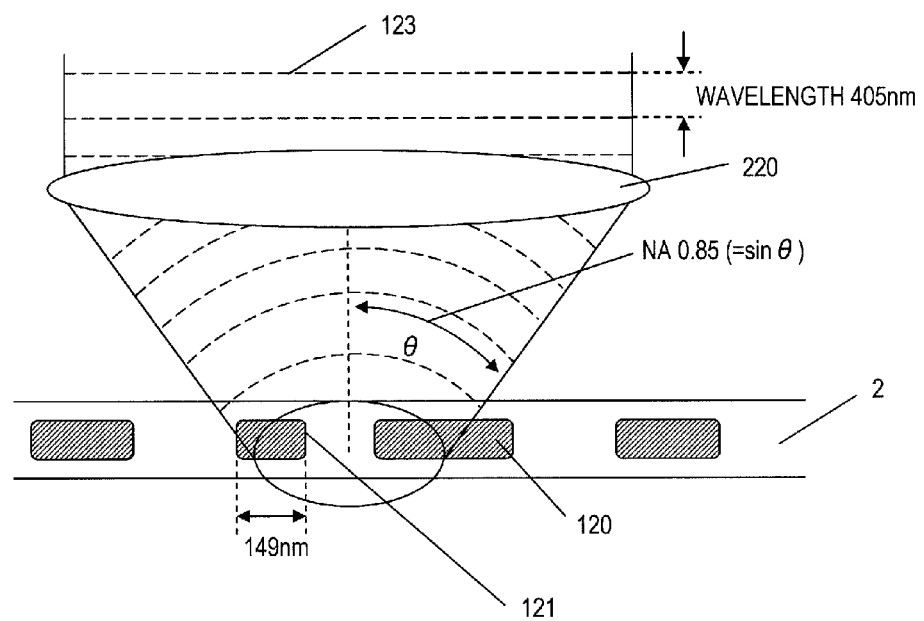
(b)
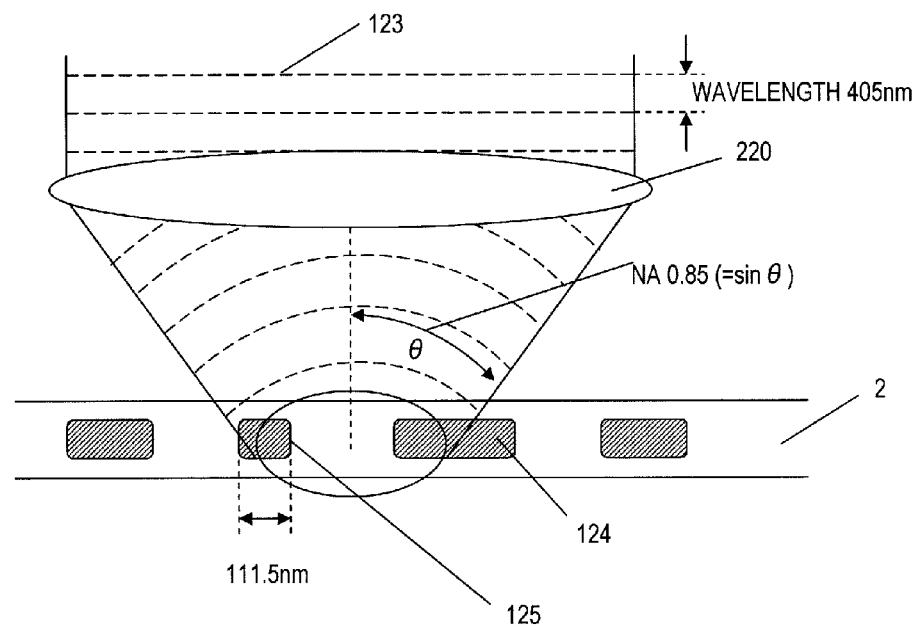

INFORMATION RECORDING MEDIUM, REPRODUCING DEVICE AND REPRODUCING METHOD

TECHNICAL FIELD

The present invention relates to a multilayer recording medium with a number of recording layers and also relates to an apparatus and method for performing a read operation on such a multilayer recording medium.

BACKGROUND ART

To increase the storage capacities of optical discs, the size of a light beam spot to be condensed by an objective lens provided for an optical head has been decreased year after year by increasing the NA (numerical aperture) of the objective lens and shortening the wavelength λ of the light emitted from a light source. Meanwhile, to further increase the storage capacities of optical disc media, a multilayer recording medium with multiple recording layers has also been proposed just lately.

In a conventional multilayer recording medium, a number of spacers with mutually different thicknesses are alternately stacked between its multiple recording layers, thereby minimizing a multiple reflection (see Patent Document No. 1, for example). FIG. 2 illustrates a conventional multilayer recording medium as disclosed in Patent Document No. 1.

In the multilayer recording medium shown in FIG. 2, eight information recording layers L0, L1, . . . and L7 are stacked in this order one upon the other so that the L0 layer is located most distant from the scanner (i.e., optical pickup) and that the L7 layer is located closet to the pickup, and seven spacers with thicknesses t0 through t6 are interposed between those information recording layers. Also, to make the intensity reflectances R(n+2) and R(n+3) of the respective reflective films of L(n+2) and L(n+3) layers, which are located shallower than an L(n) layer, satisfy $R(n+2) \times R(n+3) < 0.01$, the inequality $t1 > t0 > t3 = t5 > t2 = t4 = t6$ needs to be met. That is why settings can be made so that $t6 = t4 = t2$ and $t5 = t3$, and therefore, the number of different kinds of spacers to provide to reduce the multiple reflection can be reduced from seven to four.

On the other hand, when such a conventional multilayer recording medium is scanned, the deepest layer (i.e., the layer farthest away from the optical pickup) and the shallowest layer (i.e., the layer closest to the optical pickup) will transmit the incoming laser beam at mutually different transmittances, thus making the best readout powers on the respective recording layers different from each other in some cases (see Patent Document No. 2).

CITATION LIST

Patent Literature

Patent Document No. 1: Japanese Patent Application Laid-Open Publication No. 2006-40456
Patent Document No. 2: Japanese Patent Application Laid-Open Publication No. 2005-122862

SUMMARY OF INVENTION

Technical Problem

Considering the properties of the respective recording layers, if information was read from any of those recording layers with more than predetermined readout power, the data stored there might deteriorate. That is why the readout power should be at most equal to the predetermined readout power. However, in a situation where the storage capacity per disc were increased by simply increasing the number of recording layers stacked, the more distant from the scanner a given recording layer is, the greater the number of recording layers stacked under itself. Thus, the read operation on such a distant layer should be carried out with light that has already gone through a lot of recording layers. For example, in a multilayer optical disc in which L0, L1, . . . and L7 layers are stacked one upon the other in this order, the reflectance TR(L0) of the deepest one (L0 layer) of those layers stacked is given by the following Equation (1):

$$TR(L0) = R0 \times T1^2 \times T2^2 \times T3^2 \times T4^2 \times T5^2 \times T6^2 \times T7^2 \quad (1)$$

where T0 through T7 represent the transmittances of the respective layers and R0 through R7 represent their own reflectances.

As can be seen from this Equation (1), the reflectance of the L0 layer is obtained by multiplying together the squares of the respective transmittances of the other shallower layers. Also, supposing the reflectances R0 through R7 of the recording layers themselves are constant, the deeper a given recording layer, the lower the reflectance of that layer L0, L1, . . . or L7. If the reflectance of a given recording layer decreased, the intensity of the light returning from that layer to the photodetector would decrease, thus also decreasing the SNR and making it more difficult to get a read operation done as intended. Thus, to overcome such a problem, according to a conventional approach, the reflectances of the respective layers stacked are increased with the depth of that layer (i.e., the deepest one of the recording layers has a higher reflectance than any other recording layer) so that the incoming light is reflected substantially uniformly by those layers stacked. If a given optical disc has just two layers, then the optical structure of that disc can be determined easily by striking an adequate balance between them. In an optical disc with three or more layers, however, it is more and more often necessary to increase the transmittance of a shallow layer and decrease the reflectance of a deep layer, thus making it increasingly difficult to arrange the respective recording layers as intended. Such a problem is particularly noticeable on a rewritable optical disc, in which it is difficult to ensure a good SNR for its recording film. In scanning such an optical disc with low reflectance, the SNR could be increased by raising the readout power during a read operation and increasing the intensity of the light returning from each recording layer. However, the lower the reflectance of a given recording layer is, the more and more often the following problem will arise if the readout power is increased to ensure sufficient SNR. As a result, according to a conventional technique, it has been actually difficult to ensure a sufficiently good SNR just by increasing the readout power.

For example, in an optical disc consisting of eight recording layers L0 through L7, the power P(L0) of the light that irradiates the L0 layer is represented by the following Equation (2):

$$P(L0) = Pw \times T1 \times T2 \times T3 \times T4 \times T5 \times T6 \times T7 \quad (2)$$

where Pw represents the readout power of a laser beam that has been radiated from an optical pickup and incident on the optical disc.

As can be seen from this Equation (2), the power of the light that irradiates a deep layer is obtained by multiplying together the respective transmittances T of the other shallower layers and the readout power Pw. T is smaller than one.

That is why the deeper a given recording layer, the lower the power of the light that irradiates that layer during a read operation, which means that the deeper the given recording layer, the less likely the stored data will deteriorate even when irradiated with readout radiation. Consequently, theoretically speaking, the deeper the given recording layer, the higher the readout power can be. It should be beneficial in terms of SNR to increase the readout power according to the depth of a given recording layer in a multilayer optical disc in which the deeper a given recording layer, the lower the reflectance tends to be as represented by Equation (1). If the readout power is simply increased to ensure a good enough SNR, a read operation can certainly be carried out safely on such a deep layer without deteriorating the data stored there. However, in a situation where the control operation lost stability due to the impact applied externally to the optical disc drive or the presence of a scratch on the given disc, the incoming light could strike on another layer by mistake (i.e., an unintentional layer-to-layer jump could happen). In that case, the data stored in that wrong layer could deteriorate. For that reason, it is usually difficult to perform a read operation with the readout power increased so much as to ensure a good enough SNR.

It is therefore an object of the present invention to provide a multilayer information recording medium in which even if such an unintentional layer-to-layer jump has happened, the data stored in that recording layer that has been reached by mistake never deteriorates. Another object of the present invention is to provide an optical disc drive that can perform a read operation on such a multilayer optical disc with a good enough SNR and at a low error rate.

Solution to Problem

An information recording medium according to the present invention is a multilayer information recording medium including a number of information recording layers on which information is stored. At least one of those information recording layers uses different readout power to read information than the other information recording layers. And a base thickness between each pair of adjacent ones of the information recording layers is equal to or greater than a predetermined thickness.

In one preferred embodiment, the base thickness is a thickness at which the intensity of light decreases to a predefined degree or more due to aberration.

Another information recording medium according to the present invention includes at least three information recording layers. If the readout power of a laser beam in reading information from an $n^{th}$ one $L(n)$ (where n is an integer that is equal to or greater than zero) of the information recording layers, which are counted sequentially from one of the information recording layers that is located most distant from the data side of the information recording medium, is identified by $Pw(n)$, and if the readout power of the laser beam in reading information from an $(n+a)^{th}$ one $L(n+a)$ of the information recording layers is identified by $Pw(n+a)$ (where a is an integer that satisfies $n+a \geq 0$ and $a \neq 0$), then a base thickness between each pair of adjacent ones of the information recording layers is determined so that the intensity of the light when the information recording layer $L(n+a)$ is irradiated with a laser beam having the readout power $Pw(n)$ becomes equal to or lower than that of the light when the information recording layer $L(n+a)$ is irradiated with a laser beam having the readout power $Pw(n+a)$.

Still another information recording medium according to the present invention includes at least three information recording layers. If the readout power of a laser beam in reading information from an $n^{th}$ one $L(n)$ (where n is an integer that is equal to or greater than zero) of the information recording layers, which are counted sequentially from one of the information recording layers that is located most distant from the data side of the information recording medium, is identified by $Pw(n)$, and if the readout power of the laser beam in reading information from an $(n+a)^{th}$ one $L(n+a)$ of the information recording layers is identified by $Pw(n+a)$ (where a is an integer that satisfies $n+a \geq 0$ and $a \neq 0$), and if the base thickness between the information recording layers $L(n)$ and $L(n+a)$ is identified by D, then the information recording medium satisfies $$100 \times Pw(n)/Pw(n+a) \geq -0.1238 \times D^2 - 2.772 \times D + 106.56,$$
$$\text{and } Pw(n) \leq Pw(n+a).$$

A reading method according to the present invention is a method for reading information from the information recording medium described above. The method includes the steps of: irradiating the information recording layer $L(n)$ with a laser beam having the readout power $Pw(n)$ in reading information from the information recording layer $L(n)$; and irradiating the information recording layer $L(n+a)$ with a laser beam having the readout power $Pw(n+a)$ in reading information from the information recording layer $L(n+a)$.

A reading apparatus according to the present invention is an apparatus for reading information from the information recording medium described above. The apparatus includes an irradiating section for irradiating the information recording medium with a laser beam. The irradiating section irradiates the information recording layer $L(n)$ with a laser beam having the readout power $Pw(n)$ in reading information from the information recording layer $L(n)$. The irradiating section irradiates the information recording layer $L(n+a)$ with a laser beam having the readout power $Pw(n+a)$ in reading information from the information recording layer $L(n+a)$.

An information recording medium making method according to the present invention is a method of making an information recording medium with k information recording layers (where k is an integer that is equal to or greater than three). The method includes the steps of: forming the k information recording layers, from which information is retrievable using a laser beam with a wavelength of 400 nm to 410 nm through an objective lens with a numerical aperture of 0.84 to 0.86, on a substrate with a thickness of 1.1 mm; forming (k-1) spacer layers between the information recording layers; and forming a protective coating with a thickness of 0.1 mm or less on the $k^{th}$ one of the information recording layers as counted from the substrate. The step of forming information recording layers includes: making either concentric or spiral tracks on one of two groups of the information recording layers that are either odd-numbered or even-numbered as counted from the substrate so that the laser beam scans that group of information recording layers from some outer radial location on the information recording medium toward the inner edge thereof; and making either concentric or spiral tracks on the other group of the information recording layers that are either even-numbered or odd-numbered so that the laser beam scans that group of information recording layers from some inner radial location on the information recording medium toward the outer edge thereof. If the readout power of the laser beam in reading information from an $n^{th}$ one $L(n)$ (where n is an integer that is equal to or greater than zero) of the information recording layers, which are counted sequentially from one of the information recording layers that is located most distant from the data side of the information recording medium, is identified by $Pw(n)$, and if the readout power of the laser beam in reading information from an $(n+a)^{th}$ one $L(n+a)$ of the information recording layers, which are counted sequentially from the most distant information recording layer from the data side of the information recording medium, is identified by $Pw(n+a)$ (where a is an integer that satisfies $n+a \geq 0$ and $a \neq 0$), and if the base thickness between the information recording layers $L(n)$ and $L(n+a)$ is identified by D, then the information recording medium satisfies $$100 \times Pw(n)/Pw(n+a) \geq -0.1238 \times D^2 - 2.772 \times D + 106.56,$$
$$\text{and } Pw(n) \leq Pw(n+a).$$

Advantageous Effects of Invention

According to the present invention, all of the recording layers have respectively different best readout powers or only some of the recording layers have a different readout power from the others, and the base thickness between the respective recording layers is equal to or greater than a predetermined thickness. Thus, by adopting the arrangement of the present invention, the readout powers for the respective recording layers can be determined so as not to deteriorate or erase stored data by mistake even if an unintentional layer-to-layer jump has happened.

BRIEF DESCRIPTION OF DRAWINGS

FIG. 4 shows how the light intensity may change with the base thickness in the recording medium as a preferred embodiment of the present invention.

FIG. 5 shows, using an approximation equation, the relation between the base thickness and the light intensity in a preferred embodiment of the present invention.

FIG. 9 illustrates the structure of a dual-layer disc as a preferred embodiment of the present invention.

FIG. 10 illustrates the structure of a three-layer disc as a preferred embodiment of the present invention.

FIG. 11 illustrates the structure of a four-layer disc as a preferred embodiment of the present invention.

FIG. 13(a) illustrates an exemplary 25 GB BD as a preferred embodiment of the present invention and FIG. 13(b) illustrates an optical disc as a preferred embodiment of the present invention that has a higher storage density than the 25 GB BD.

DESCRIPTION OF EMBODIMENTS

Hereinafter, preferred embodiments of a multilayer information recording medium, reading method and reading apparatus according to the present invention will be described with reference to the accompanying drawings.

Embodiment 1

Figure 1:
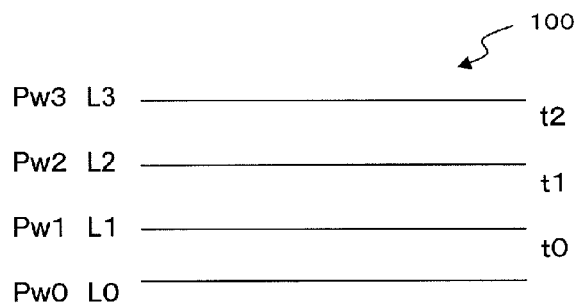
FIG. 1 illustrates an exemplary structure for a recording medium as a specific preferred embodiment of the present invention.
Figure 2:
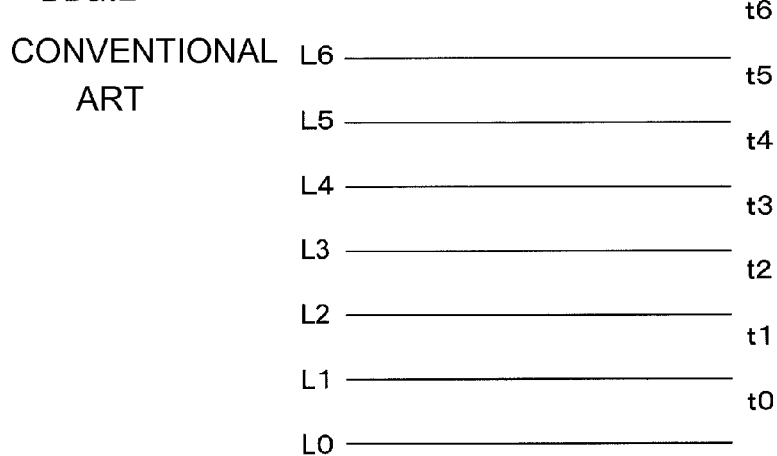
FIG. 2 illustrates an exemplary structure for a recording medium.

FIG. 1 illustrates the structure of a multilayer information recording medium (optical disc) 100 as a specific preferred embodiment of the present invention. In the following description, any pair of components shown in both of FIGS. 1 and 2 and having substantially the same function will be identified by the same reference numeral and a detailed description thereof will be omitted herein.

The multilayer information recording medium 100 has three or more recording layers on which information can be stored. In FIG. 1, L0 through L3 denote respective recording layers, and t0 through t2 denote base thicknesses between the respective recording layers. As a spacer layer is inserted between each pair of recording layers, the "base thickness" means the thickness of the spacer layer. Also, Pw0 through Pw3 denote the best readout powers for the respective recording layers L0 to L3.

Figure 3:
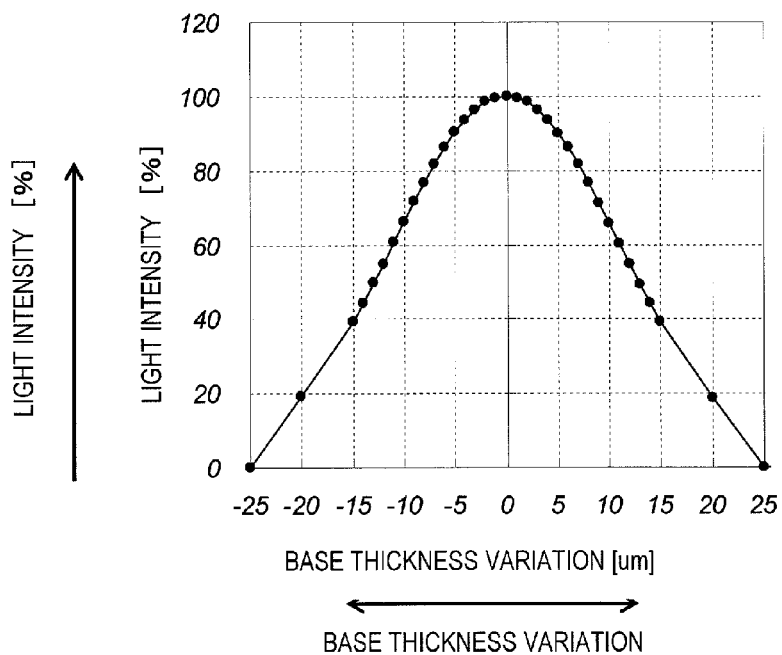
FIG. 3 shows how the light intensity changes with the base thickness in a preferred embodiment of the present invention.

FIG. 3 shows how the intensity of light changes with the base thickness. In this case, the "light intensity" represents the power of light falling on a unit area of a recording layer. In FIG. 3, a light intensity associated with a base thickness, at which the laser beam could be focused most efficiently on the target recording layer, is supposed to be 100%. As shown in FIG. 3, if the base thickness of a recording medium changes, an objective lens built in an optical pickup comes to have a value that has deviated from the designed one, thus producing a spherical aberration and causing a variation in light intensity, which is almost equivalent to a variation in readout power. That is to say, for a recording layer, a variation in light intensity due to the change of the base thickness and a variation in the optical power of the laser beam at a constant base thickness mean substantially the same.

Also, the relation between the base thickness and the light intensity changes according to the wavelength of the laser beam used. In FIG. 3, shown is how the light intensity varied according to the base thickness in a situation where a blue laser beam was used on a Blu-ray Disc (BD) at an NA of 0.85 and at a wavelength of 405 nm, for example. This variation in light intensity is substantially proportional to the third power of NA and the wavelength. That is to say, by setting the NA to be high, even if the base thickness varies just slightly, the light intensity will decrease significantly. In that case, even if the interval between recording layers is narrow, the variation in light intensity can still be significant.

Specifically, if a multilayer disc has an interval of 20 to 30 μm between its adjacent layers and if the thickest recording layer thereof has a base thickness of approximately 100 μm and if any other additional recording layers are provided so as to have thicknesses of smaller than 100 μm, the light intensity will vary by about 30% even between two layers that are spaced apart from each other by approximately 10 μm or more as long as NA is higher than 0.8. For example, if there is an interval (i.e., a base thickness) of 10 μm between L0 and L1 layers, the light intensity will decrease to 70% even when an unintentional layer-to-layer jump to the L1 layer has happened by mistake while the L0 layer is being scanned. That is why even if the readout power for the L0 layer was defined to be 1.42 (=1/0.7) times as high as the power for the L1 layer, no damage would be done on the L1 layer.

Such a decrease in light intensity is proportional to the third power of NA and the wavelength of the light beam. Thus, as long as NA is equal to or greater than 0.85, a more significant decrease in light intensity than the one shown in FIG. 3 will be caused. As a result, even if the base thickness remains the same, a more significant effect can be achieved and a greater readout power can be defined for the L0 layer. The same can be said about the wavelength. That is to say, the shorter the wavelength, the more significant that effect will be.

As can be seen, in a situation where respective recording layers have different best readout powers, if an unintentional layer-to-layer jump has happened, the readout power for the recording layer reached by mistake as a result of the layer-to-layer jump may be higher than the previous one, and the data stored there could deteriorate. To avoid such a problem, it is effective to set the base thickness between each pair of adjacent recording layers to a predetermined value or more to take advantage of a decrease in light intensity due to a variation in base thickness. Thus, according to this preferred embodiment, the base thickness between each pair of adjacent recording layers is determined by reference to such a relation between the base thickness and the light intensity. As for readout powers for reading information, at least one recording layer requires a different readout power from the other recording layers. But such a difference is dealt with by setting the base thickness between each pair of adjacent recording layers to be equal to or greater than a predetermined thickness. As used herein, the "predetermined thickness" is a thickness at which the intensity of light decreases to a predefined degree or more due to aberration. This point will be described in further detail later.

Hereinafter, it will be described with reference to FIG. 4 how to determine the base thickness according to this preferred embodiment by reference to the relation between the base thickness and the light intensity. FIG. 4 shows how the light intensity changes with the base thickness.

In FIG. 4, when information is read from the recording layer L0, the laser beam is supposed to have the best readout power Pw0 and the light intensity when the laser beam is focused on the recording layer L0 is supposed to be 100%.

On the other hand, when information is read from the recording layers L1, L2 and L3, the laser beam is supposed to have best readout powers Pw1, Pw2 and Pw3, respectively. In this case, the readout powers for the respective recording layers are normalized so that Pw0=100, Pw1=80, and Pw2=Pw3=70 are satisfied. For example, when a laser beam with the readout power Pw1 is focused on the recording layer L1, the light intensity is represented by 80%. Also, the base thickness is determined so that even if the laser beam with the readout power Pw0 is focused on the recording layer L1, the light intensity becomes equal to or smaller than 80%. That is to say, the base thickness is determined so that that light intensity becomes equal to or smaller than the one in a situation where a laser beam with the readout power Pw1 is focused on the recording layer L1.

In the same way, when a laser beam with the readout power Pw2 is focused on the recording layer L2, the light intensity is represented by 70%. Also, the base thickness is determined so that even if the laser beam with the readout power Pw1 is focused on the recording layer L2, the light intensity becomes equal to or smaller than 70%. That is to say, the base thickness is determined so that that light intensity becomes equal to or smaller than the one in a situation where a laser beam with the readout power Pw2 is focused on the recording layer L2.

In this manner, by utilizing the relation shown in FIG. 3, the base thickness between each pair of adjacent recording layers can be determined appropriately according to the readout powers for the recording layers.

The disclosed invention may be modified in numerous ways and may assume many embodiments other than those specifically described above without departing from the spirit of the present invention. For example, the base thickness may be determined so that the light intensity on the recording layer that has been reached accidentally as a result of an unintentional layer-to-layer jump either agrees with, or becomes smaller than, the best light intensity for that recording layer.

Also, in the preferred embodiment described above, the base thickness is supposed to be determined so that the light intensity on the recording layer that has been reached accidentally as a result of an unintentional layer-to-layer jump becomes equal to or smaller than the best light intensity for that recording layer. However, the base thickness may also be determined so that the light intensity on that unexpected recording layer becomes smaller than a light intensity at which data stored on that recording layer starts to deteriorate.

Furthermore, in the preferred embodiment described above, the base thickness between each pair of adjacent recording layers is determined by reference to the relation between the variation in base thickness and the light intensity. However, the base thickness may also be determined by using a simple approximation equation. For example, as for a Blu-ray Disc (BD) that uses a blue laser beam, the following approximation Equations (3) and (4) are obtained based on the relation between the base thickness, the light intensity and the readout power, and the base thickness can be determined by those equations. FIG. 5 shows the relation between the base thickness and the light intensity by the following approximation equation:

$$S=-0.1238 \times d^2 + 2.772 \times d + 106.56 \qquad (3)$$

where S represents the light intensity [%] and d represents a variation in base thickness [μm] from a value associated with a light intensity of 100% and is a positive integer.

Suppose the readout power of the laser beam for reading information from an $n^{th}$ one L(n) of the information recording layers, which are counted sequentially from the most distant recording layer from the data side surface (i.e., the upside shown in FIG. 1) of the optical disc 100, is identified by Pw(n), where n is an integer that is equal to or greater than zero. For example, the most distant (i.e., the deepest) recording layer from the data side may be identified by L(0) and its readout power Pw0 may be identified by Pw(0). On the other hand, the readout power of the laser beam for reading information from the $(n+a)^{th}$ information recording layer L(n+a) is identified by Pw(n+a), where a is an integer that satisfies n+a≧0 and a≠0. For instance, if n=0 and a=1, then the $(n+a)^{th}$ layer will be the recording layer L1.

In this case, even if the readout power Pw(n) is higher than the readout power Pw(n+a), the light intensity when the information recording layer L(n+a) is irradiated with the laser beam with the readout power Pw(n) is defined to be equal to or smaller than the light intensity when the information recording layer L(n+a) is irradiated with the laser beam with the readout power Pw(n+a).

In the following Equation (4), if the readout power for one recording layer that is located more distant from the data side is lower than the power for the other layer, then a becomes a positive integer. On the other hand, if the readout power for the one recording layer that is located more distant from the data side is higher than the power for the other layer, then a becomes a negative integer. In the latter case, the recording layer L(n+a) will be located more distant from the data side than the recording layer L(n) is.

The base thickness D between the information recording layers L(n) and L(n+a) can be calculated by:

$$100 \times Pw(n)/Pw(n+a) = -0.1238 \times D^2 - 2.772 \times D + 106.56 \quad (4)$$

where $Pw(n) \leq Pw(n+a)$ and $Pw(n)/Pw(n+a)$ is expressed in percent. For example, if $Pw(n)=Pw(n+a)$ (i.e., if the $Pw(n)/Pw(n+a)$ ratio is one), the left side of Equation (4) is 100%. Meanwhile, n is an integer that is equal to or greater than zero and a is an integer that satisfies $n+a \geq 0$ and $a \neq 0$.

The base thickness D is determined so that the left side of Equation (4) represents an appropriate ratio. If a is a negative integer and if the readout power $Pw(n+a)$ is greater than the readout power $Pw(n)$, then the light intensity when the information recording layer L(n) is irradiated with a laser beam with the readout power $Pw(n+a)$ may be equal to the light intensity when information recording layer L(n) is irradiated with a laser beam with the readout power $Pw(n)$.

On the other hand, if a is a negative integer and if the readout power $Pw(n+a)$ is greater than the readout power $Pw(n)$, then the light intensity when the information recording layer L(n) is irradiated with a laser beam with the readout power $Pw(n+a)$ may be equal to or smaller than the light intensity when information recording layer L(n) is irradiated with a laser beam with the readout power $Pw(n)$. The base thickness D that satisfies such a condition is obtained by the following Inequality (5), which is a modified version of Equation (4):

$$100 \times Pw(n)/Pw(n+a) \geq -0.1238 \times D^2 - 2.772 \times D + 106.56 \quad (5)$$

Embodiment 2

Figure 6:
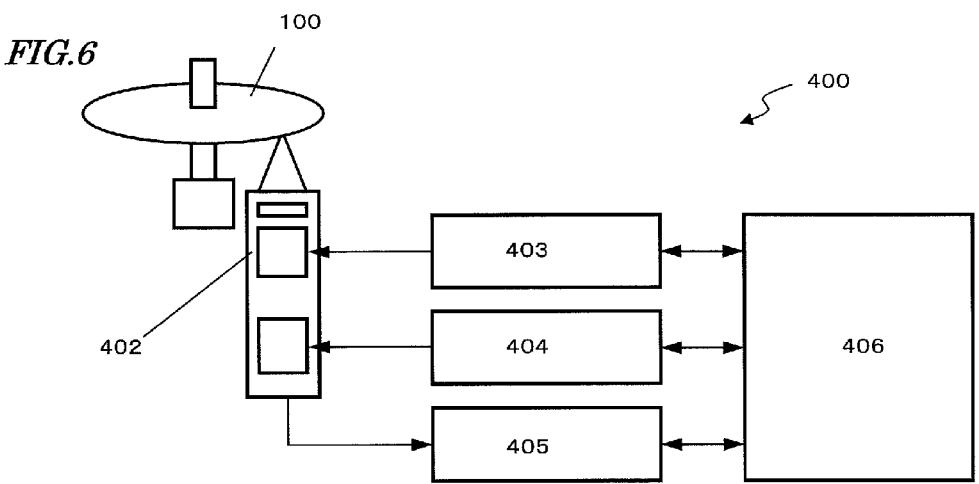
FIG. 6 illustrates a reading apparatus as a preferred embodiment of the present invention.

FIG. 6 illustrates a configuration for a reading apparatus 400 according to the present invention. The reading apparatus 400 is an apparatus for reading information from an optical disc 100.

The reading apparatus includes an optical pickup 402, a semiconductor laser control section 403 and a servo processing section 404 for controlling the optical pickup 402, a read signal processing section 405 for processing the read signal supplied from the optical pickup, and a central processing unit (CPU) section 406 for controlling multiple components included in this reading apparatus 400.

In response to a control signal supplied externally from a computer (not shown), the CPU section 406 controls the semiconductor laser control section 403, the servo processing section 404 and the read signal processing section 405.

The semiconductor laser control section 403 makes settings on readout power and RF signal superposition, and gets a laser beam emitted from the optical pickup (corresponding to the "irradiating section") 402 with predetermined laser power and incident on the optical disc 100. Specifically, in reading information from the information recording layer L(n), the optical pickup 402 irradiates the information recording layer L(n) with a laser beam with a readout power $Pw(n)$. On the other hand, in reading information from the information recording layer L(n+a), the optical pickup 402 irradiates the information recording layer L(n+a) with a laser beam with a readout power $Pw(n+a)$.

The servo processing section performs a tracking control and a focus control using the detection signals generated by the optical pickup 402, thereby controlling the optical pickup 402 so that the optical pickup 402 can perform focusing and tracking operations accurately on the information recording medium 100.

The read signal processing section 405 performs data read signal processing and wobble signal processing, thereby reading data and physical addresses and performing other kinds of processing.

A recording medium normally has an area where various kinds of information about the recording medium is stored. Thus, the optical disc drive usually recognizes the type of a given recording medium by reference to the information that has been retrieved from that area and makes setting so as to generate a predetermined readout power. However, in some multilayer recording media, the readout powers sometimes need to be changed for one recording layer after another. That is why if an unintentional layer-to-layer jump has happened by mistake while such a multilayer recording medium is scanned, then the readout power for the recording layer reached by mistake as a result of the layer-to-layer jump could be higher than the previous one, thus possibly deteriorating the data stored there.

As a means for avoiding such a problem, it will be effective to determine the base thickness between each pair of adjacent recording layers according to the type of the given recording medium recognized and then set the readout powers for the respective recording layers.

That is why according to the magnitude of decrease in light intensity due to a variation in base thickness between each pair of adjacent recording layers, readout powers for the respective recording layers are determined.

It is possible to derive the proportionality between readout powers for the respective recording layers based on the base thickness between each pair of adjacent recording layers by reference to the relation shown in FIG. 3. And the readout powers for the respective recording layers are determined so as to meet the appropriate proportionality described above. For example, the proportionality shown in FIG. 4 may be adopted.

For example, once the type of the given recording medium has been recognized, the base thickness between each pair of adjacent recording layers of that recording medium can be determined. Thus, information about proper light intensities for the respective recording layers may be stored in a memory (not shown) in the CPU section 406. When the type of the given recording medium is recognized, that light intensity information may be retrieved from the memory of the CPU section. The semiconductor laser control section 403 sets the readout power according to the base thickness thus determined, thereby irradiating each recording layer with a laser beam with an appropriate light intensity. Alternatively, information about appropriate readout powers for the respective recording layers could be stored in the memory of the CPU section 406.

In that case, the readout power information may be obtained and stored by calculating readout powers by reference to the relation between the base thickness and the light intensity shown in FIG. 4 so that the light intensity when a laser beam with a readout power for one recording layer is focused unintentionally on another recording layer becomes as high as the light intensity when a laser beam with a readout power for the latter recording layer is focused on that recording layer as intended. And when the type of the given recording medium is recognized, the readout power may be determined.

While the present invention has been described with respect to preferred embodiments thereof, the disclosed invention may be modified in numerous ways and may assume many embodiments other than those specifically described above without departing from the spirit of the present invention. For example, the readout power information may also be obtained and stored so that the light intensity when a laser beam with a readout power for one recording layer is focused unintentionally on another recording layer becomes equal to or lower than the light intensity when a laser beam with a readout power for the latter recording layer is focused on that recording layer as intended.

Furthermore, in the preferred embodiment described above, the readout power information is supposed to be obtained and stored so that the light intensity on a wrong recording layer reached by mistake as a result of an unintentional layer-to-layer jump becomes equal to or lower than an appropriate light intensity for that recording layer. However, the readout power information may also be obtained and stored so that the light intensity on that unexpected recording layer becomes equal to or lower than a light intensity at which the data stored on that recording layer starts to deteriorate.

Alternatively, the readout power may be determined and saved by reference to the relation between the variation in base thickness and the light intensity as shown in FIG. 3 or 4. Still alternatively, the readout power may be calculated by the approximation equation shown in FIG. 5 or represented by Equation (3), (4) or (5) and then saved.

Also, readout powers that can be defined for the respective recording layers of a recording medium could fall within a range from a readout power that is low enough to avoid deteriorating the quality of a read signal through a readout power that is high enough to avoid deteriorating the data stored there. In such a situation, the readout powers for the respective recording layers could be determined so as to avoid deteriorating the stored data as completely as possible within the range of readout powers that can be set for the respective recording layers. In a situation where the readout power is set close to the upper limit, if an unintentional layer-to-layer jump has happened, the deterioration of the stored data cannot be avoided entirely but its influence can still be minimized.

Hereinafter, an information recording medium according to the present invention will be described in further detail.

<Main Parameters>

Although the present invention is applicable to various types of recording media including Blu-ray Discs (BDs) and discs compliant with other standards, the following description will be focused on a BDs. Specifically, BDs are classified according to the property of their recording film into various types. Examples of those various BDs include a BD-ROM (read-only), a BD-R (write-once), and a BD-RE (rewritable). And the present invention is applicable to any type of BD or an optical disc compliant with any other standard, no matter whether the recording medium is a ROM (read-only), an R (write-once) or an RE (rewritable). Main optical constants and physical formats for Blu-ray Discs are disclosed in "Blu-ray Disc Reader" (published by Ohmsha, Ltd.) and on White Paper at the website of Blu-ray Disc Association (http://www.blu-raydisc.com), for example.

Specifically, as for a BD, a laser beam with a wavelength of approximately 405 nm (which may fall within the range of 400 nm to 410 nm supposing the tolerance of errors is ±5 nm with respect to the standard value of 405 nm) and an objective lens with an NA (numerical aperture) of approximately 0.85 (which may fall within the range of 0.84 to 0.86 supposing the tolerance of errors is ±0.01 with respect to the standard value of 0.85) are used. A BD has a track pitch of about 0.32 μm (which may fall within the range of 0.310 to 0.330 μm supposing the tolerance of errors is ±0.010 μm with respect to the standard value of 0.320 μm) and has one or two recording layers. A BD has a single-sided single-layer or a single-sided dual-layer structure on the laser beam incident side, and its recording plane or recording layer is located at a depth of 75 μm to 100 μm as measured from the surface of the protective coating of the BD.

A write signal is supposed to be modulated by 17PP modulation technique. Recording marks are supposed to have the shortest mark length of 0.149 μm or 0.138 μm (which is the length of a 2T mark, where T is one cycle of a reference clock pulse and a reference period of modulation in a situation where a mark is recorded in accordance with a predetermined modulation rule), i.e., a channel bit length T of 74.50 nm or 69.00 nm. The BD has a storage capacity of 25 GB or 27 GB (more exactly, 25.025 GB or 27.020 GB) if it is a single-sided, single-layer disc but has a storage capacity of 50 GB or 54 GB (more exactly, 50.050 GB or 54.040 GB) if it is a single-sided, dual-layer disc.

The channel clock frequency is supposed to be 66 MHz (corresponding to a channel bit rate of 66.000 Mbit/s) at a standard BD transfer rate (BD 1×), 264 MHz (corresponding to a channel bit rate of 264.000 Mbit/s) at BD 4× transfer rate, 396 MHz (corresponding to a channel bit rate of 396.000 Mbit/s) at BD 6× transfer rate, and 528 MHz (corresponding to a channel bit rate of 528.000 Mbit/s) at BD 8× transfer rate.

And the standard linear velocity (which will also be referred to herein as "reference linear velocity" or "1×") is supposed to be 4.917 m/sec or 4.554 m/sec. The 2×, 4×, 6× and 8× linear velocities are 9.834 m/sec, 19.668 m/sec, 29.502 m/sec, and 39.336 m/sec, respectively. A linear velocity higher than the standard linear velocity is normally a positive integral number of times as high as the standard linear velocity. But the factor does not have to be an integer but may also be a positive real number. Optionally, a linear velocity that is lower than the standard linear velocity (such as a 0.5× linear velocity) may also be defined.

It should be noted that these parameters are those of single-layer or dual-layer BDs already on the market, which have a storage capacity of approximately 25 GB or approximately 27 GB per layer. To further increase the storage capacities of BDs, high-density BDs with a storage capacity of approximately 32 GB or approximately 33.4 GB per layer and three- or four-layer BDs have already been researched and developed. Hereinafter, exemplary applications of the present invention to such BDs will be described.

<Structure with Multiple Information Recording Layers>

Figure 7:
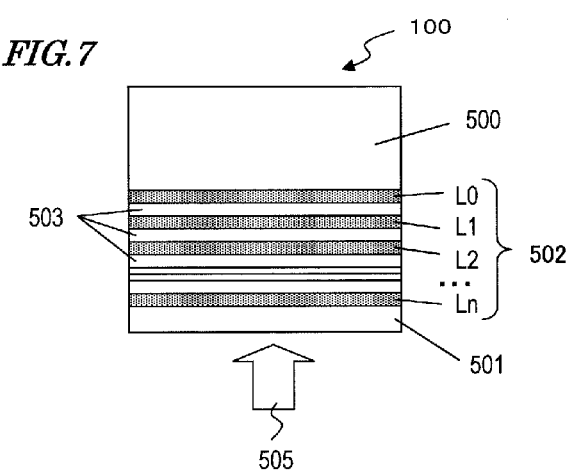
FIG. 7 illustrates the structure of a multilayer disc as a preferred embodiment of the present invention.
Figure 8:
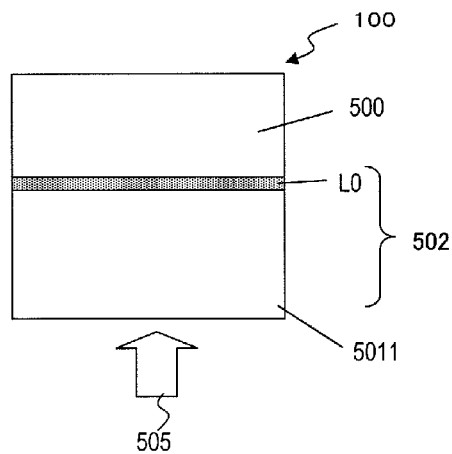
FIG. 8 illustrates the structure of a single-layer disc as a preferred embodiment of the present invention.

For example, supposing the optical disc is a single-sided disc, from/on which information is read and/or written by having a laser beam incident on the protective coating (cover layer) side, if two or more recording layers need to be provided, then those multiple recording layers should be arranged between the substrate and the protective coating. An exemplary structure for such a multilayer disc is shown in FIG. 7. The optical disc shown in FIG. 7 has (n+1) information recording layers 502 (where n is an integer that is equal to or greater than zero). Specifically, in this optical disc, a cover layer 501, (n+1) information recording layers (layers Ln through L0) 502, and a substrate 500 are stacked in this order on the surface on which a laser beam 505 is incident. Also, between each pair of adjacent ones of the (n+1) information recording layers 502, inserted as an optical buffering member is a spacer layer 503. That is to say, the reference layer L0 may be arranged at the deepest level that is located at a predetermined depth from the light incident surface (i.e., at the greatest distance from the light source). Multiple recording layers L1, L2, . . . and Ln may be stacked one upon the other from over the reference layer L0 toward the light incident surface.

In this case, the depth of the reference layer L0 as measured from the light incident surface of the multi-layer disc may be equal to the depth (e.g., approximately 0.1 mm) of the only recording layer of a single-layer disc as measured from the light incident surface. If the depth of the deepest layer (i.e., the most distant layer) is constant irrespective of the number of recording layers stacked (i.e., if the deepest layer of a multilayer disc is located at substantially the same distance as the only recording layer of a single-layer disc), compatibility can be ensured in accessing the reference layer, no matter whether the given disc is a single-layer one or a multilayer one. In addition, even if the number of recording layers stacked increases, the influence of tilt will hardly increase. This is because although the deepest layer is affected by tilt most, the depth of the deepest layer of a multilayer disc is approximately the same as that of the only recording layer of a single-layer disc, and does not increase in this case even if the number of recording layers stacked is increased.

As for the beam spot moving direction (which will also be referred to herein as a "tracking direction" or a "spiral direction"), the optical disc may be either a parallel path type or an opposite path type. In a disc of the parallel path type, the spot goes in the same direction on every layer, i.e., from some inner radial location toward the outer edge of the disc or from some outer radial location toward the inner edge of the disc on every recording layer.

On the other hand, in a disc of the opposite path type, the spot moving directions are changed into the opposite one every time the layers to scan are changed from one recording layer into an adjacent one. For example, if the spot on the reference layer L0 goes from some inner radial location toward the outer edge (which direction will be simply referred to herein as "outward"), then the spot on the recording layer L1 will go from some outer radial location toward the inner edge (which direction will be simply referred to herein as "inward"), the spot on the recording layer L2 will go outward, and so forth. That is to say, the spot on the recording layer Lm (where m is either zero or an even number) will go outward but the spot on the recording layer Lm+1 will go inward. Conversely, the spot on the recording layer Lm (where m is either zero or an even number) will go inward but the spot on the recording layer Lm+1 will go outward.

As for the thickness of the protective coating (cover layer), to minimize the influence of spot distortion due to either a decrease in focal length with an increase in numerical aperture NA or the tilt, the protective coating may have its thickness reduced. A numerical aperture NA is defined to be 0.45 for a CD, 0.65 for a DVD, but approximately 0.85 for a BD. For example, if the recording medium has an overall thickness of approximately 1.2 mm, the protective coating may have a thickness of 10 μm to 200 μm. More specifically, a single-layer disc may include a transparent protective coating with a thickness of approximately 0.1 mm and a substrate with a thickness of approximately 1.1 mm. On the other hand, a dual-layer disc may include a protective coating with a thickness of approximately 0.075 mm, a spacer layer with a thickness of approximately 0.025 mm and a substrate with a thickness of approximately 1.1 mm. And if the disc has three or more recording layers, the thickness(es) of the protective coating and/or spacer layer could be further reduced.

<Configurations for Single- to Four-Layer Discs>

FIGS. 8, 9, 10 and 11 illustrate exemplary configurations for single-layer, dual-layer, three-layer and four-layer discs, respectively. As described above, if the distance from the light incident surface to the reference layer L0 is supposed to be constant, each of these discs may have a total disc thickness of approximately 1.2 mm (but is more preferably 1.40 mm or less if there is a label printed) and the substrate 500 may have a thickness of approximately 1.1 mm. That is why the distance from the light incident surface to the reference layer L0 will be approximately 0.1 mm in any of the examples shown in FIGS. 9 to 11. In the single-layer disc shown in FIG. 8 (i.e., if n=0 in FIG. 7), the cover layer 5011 has a thickness of approximately 0.1 mm. In the dual-layer disc shown in FIG. 9 (i.e., if n=1 in FIG. 7), the cover layer 5012 has a thickness of approximately 0.075 mm and the spacer layer 5302 has a thickness of approximately 0.025 mm. And in the three-layer disc shown in FIG. 10 (i.e., if n=2 in FIG. 7) and in the four-layer disc shown in FIG. 11 (i.e., if n=3 in FIG. 7), the cover layer 5013, 5014 and/or the spacer layer 5303, 5304 may be even thinner.

Such a multilayer disc (i.e., a disc with k recording layers, where k is an integer that is equal to or greater than one) may be made by performing the following manufacturing process steps.

First of all, the k recording layers, from which information is retrievable using a laser beam with a wavelength of 400 nm to 410 nm through an objective lens with a numerical aperture of 0.84 to 0.86, are formed on a substrate with a thickness of approximately 1.1 mm.

Next, (k−1) spacer layers are formed between the recording layers. As for a single-layer disc, k=1 and k−1=0, and therefore, no spacer layers are provided.

Subsequently, a protective coating with a thickness of 0.1 mm or less is formed on the $k^{th}$ one of the recording layers as counted from the substrate (i.e., the most distant recording layer from the substrate in a multilayer recording medium).

In the step of forming the recording layers, when the $i^{th}$ recording layer (where i is an odd number that falls within the range of one through k) as counted from the substrate is formed, either concentric or spiral tracks are made so that the laser beam scans that recording layer from some inner radial location on the disc toward the outer edge thereof. On the other hand, when the $j^{th}$ recording layer (where j is an even number that falls within the range of one through k) as counted from the substrate is formed, either concentric or spiral tracks are made so that the laser beam scans that recording layer from some outer radial location on the disc toward the inner edge thereof. As for a single-layer disc, k=1, and therefore, the odd number i that falls within the range of one through k must be one when k=1, and only one recording layer is provided as the $i^{th}$ recording layer. Also, if k=1, there is no even number j that falls within the range of one through k, and therefore, no $j^{th}$ recording layer is provided. Optionally, the light beam scanning direction could be opposite to each other between an odd layer and an even layer.

And if the readout power of the laser beam in reading information from an $n^{th}$ one L(n) of the information recording layers, which are counted sequentially from one of the information recording layers that is located most distant from the data side of the information recording medium, is identified by Pw(n), and if the readout power of the laser beam in reading information from an $(n+a)^{th}$ one L(n+a) of the information recording layers, which are counted sequentially from the most distant recording layer from the data side of the information recording medium, is identified by Pw(n+a), and if the base thickness between the information recording layers L(n) and L(n+a) (i.e., the sum of the spacer layers between the information recording layers L(n) and L(n+a)) is identified by D, then $100 \times Pw(n)/Pw(n+a) \geq -0.1238 \times D^2 - 2.772 \times D + 106.56$, and $Pw(n) \leq Pw(n+a)$ are satisfied, (where n is an integer that is equal to or greater than zero, and a is an integer that satisfies n+a≧0 and a≠0).

A read operation is performed on such a multilayer disc (i.e., a disc with k recording layers, where k is an integer that is equal to or greater than one) by a reading apparatus that is an apparatus with the following configuration (or the method to be described later).

The disc may include a substrate with a thickness of approximately 1.1 mm, k recording layers on the substrate, (k−1) spacer layers between the recording layers (there is no spacer layer in a single-layer disc because k=1 and therefore k−1=0), and a protective coating with a thickness of 0.1 mm or less on the $k^{th}$ recording layer as counted from the substrate (i.e., the most distant recording layer in a multilayer disc). Tracks are made on each of the k recording layers, and various kinds of areas can be assigned to at least one of those tracks.

And by irradiating the disc with a laser beam with a wavelength of 400 nm to 410 nm using an objective lens with a numerical aperture of 0.84 through 0.86 through the surface of the protective coating, an optical head can read information from any of the k recording layers.

The reading apparatus includes an irradiating means for irradiating the information recording medium with a laser beam. The irradiating means irradiates an $n^{th}$ one L(n) of the information recording layers as counted from the most distant recording layer from the data side of the information recording medium with a laser beam having the readout power Pw(n) in reading information from the information recording layer L(n). And the irradiating means irradiates an $(n+a)^{th}$ one L(n+a) of the information recording layers as counted from the most distant recording layer from the data side of the information recording medium with a laser beam having the readout power Pw(n+a) in reading information from the information recording layer L(n+a), where n is an integer that is equal to or greater than zero, and a is an integer that satisfies n+a≧0 and a≠0.

Hereinafter, the physical structure of the optical disc 100 will be described in further detail.

Figure 12:
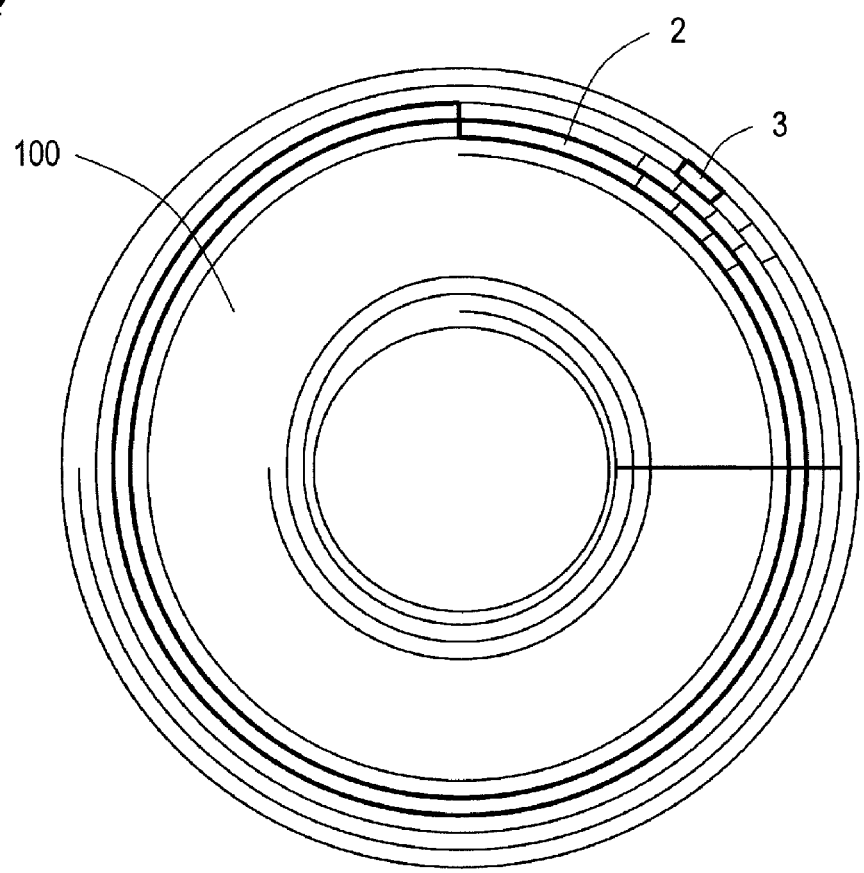
FIG. 12 illustrates the physical structure of an optical disc as a preferred embodiment of the present invention.

FIG. 12 illustrates the physical structure of an optical disc 100 according to this preferred embodiment. On the disklike optical disc 100, a lot of tracks 2 are arranged either concentrically or spirally. And each of those tracks 2 is subdivided into a lot of sectors. As will be described later, data is supposed to be written on each of those tracks 2 on the basis of a block 3 of a predetermined size.

The optical disc 100 of this preferred embodiment has a greater storage capacity per information recording layer than a conventional optical disc (such as a 25 GB BD). The storage capacity is increased by increasing the storage linear density, e.g., by shortening the mark length of recording marks to be left on the optical disc, for example. As used herein, "to increase the storage linear density" means shortening the channel bit length, which is a length corresponding to one cycle time T of a reference clock signal (i.e., a reference cycle time T of modulation in a situation where marks are recorded by a predetermined modulation rule). The optical disc 100 may have multiple information recording layers. In the following description, however, only one information recording layer thereof will be described for convenience sake. In a situation where there are multiple information recording layers in the same optical disc, even if the tracks have the same width between the respective information recording layers, the storage linear densities could also be different from one layer to another by uniformly varying the mark lengths on a layer-by-layer basis.

Each track 2 is divided into a lot of blocks every 64 kB (kilobytes), which is the data recording unit. And those blocks are given sequential block addresses. Each of those blocks is subdivided into three subblocks, each having a predetermined length (i.e., three subblocks form one block). The three subblocks are assigned subblock numbers of 0, 1 and 2 in this order.

<Storage Density>

Hereinafter, the storage density will be described with reference to FIGS. 13, 14, 15 and 16.

FIG. 13(a) illustrates an example of a 25 GB BD, for which the laser beam 123 is supposed to have a wavelength of 405 nm and the objective lens 220 is supposed to have a numerical aperture (NA) of 0.85.

As in a DVD, data is also written on the track 2 of a BD as a series of marks 120, 121 that are produced as a result of a physical variation. The shortest one of this series of marks will be referred to herein as the "shortest mark". In FIG. 13(a), the mark 121 is the shortest mark.

In a BD with a storage capacity of 25 GB, the shortest mark 121 has a physical length of 0.149 μm, which is approximately 1/2.7 of the shortest mark of a DVD. And even if the resolution of a laser beam is increased by changing the parameters of an optical system such as the wavelength (405 nm) and the NA (0.85), this value is still rather close to the limit of optical resolution, below which recording marks are no longer sensible for the light beam.

Figure 14:
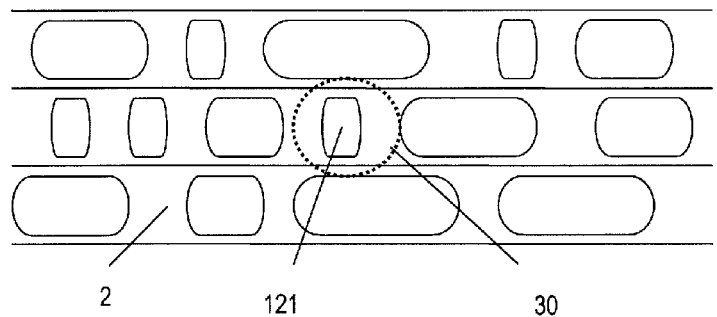
FIG. 14 illustrates how a series of recording marks on a track is irradiated with a light beam in a preferred embodiment of the present invention.

FIG. 14 illustrates a state where a light beam spot has been formed on the series of recording marks on the track. In a BD, the light beam spot 30 has a diameter of about 0.39 μm, which may vary with parameters of the optical system. If the storage linear density is increased without changing the structures of the optical system, then the recording marks will shrink for the same spot size of the light beam spot 30 and the read resolution will decrease.

On the other hand, FIG. 13(b) illustrates an example of an optical disc with an even higher storage density than a 25 GB BD. But even for such a disc, the laser beam 123 is also supposed to have a wavelength of 405 nm and the objective lens 220 is also supposed to have a numerical aperture (NA) of 0.85. Among the series of marks 124, 125 of such a disc, the shortest mark 125 has a physical length of 0.1115 μm (or 0.11175 μm). Compared to FIG. 13(a), the spot size remains approximately 0.39 μm but both the recording marks and the interval between the marks have shrunk. As a result, the read resolution will decrease.

The shorter a recording mark, the smaller the amplitude of a read signal to be generated when the recording mark is scanned with a light beam. And the amplitude goes zero when the mark length gets equal to the limit of optical resolution. The inverse number of one period of these recording marks is called a "spatial frequency" and a relation between the spatial frequency and the signal amplitude is called an "optical transfer function (OTF)". As the spatial frequency rises, the signal amplitude decreases almost linearly. And the retrievable limit frequency at which the amplitude of the signal goes zero is called an OTF cutoff.

Figure 15:
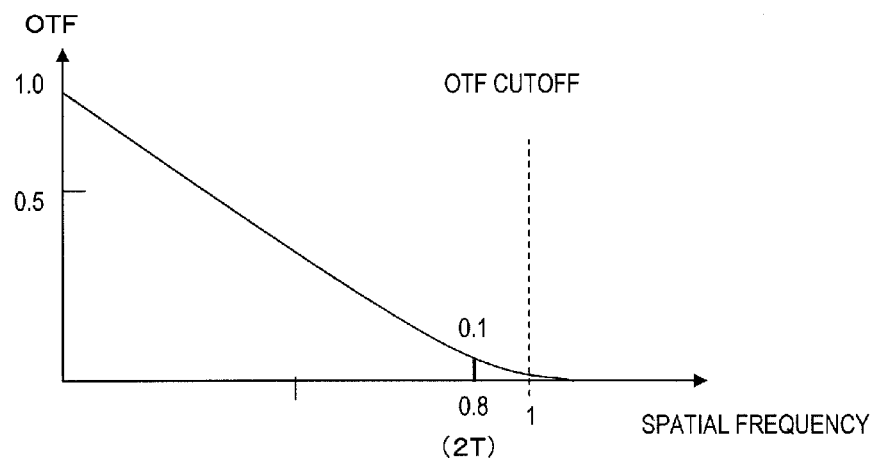
FIG. 15 is a graph showing how the OTF changes with the shortest recording mark on a disc with a storage capacity of 25 GB as a preferred embodiment of the present invention.

FIG. 15 is a graph showing how the OTF of a BD with a storage capacity of 25 GB changes with the shortest recording mark length. The spatial frequency of the shortest mark on a BD is approximately 80% of, and is rather close to, the OTF cutoff frequency. It can also be seen that a read signal representing the shortest mark has amplitude that is as small as approximately 10% of the maximum detectable amplitude. The storage capacity at which the spatial frequency of the shortest mark on a BD is very close to the OTF cutoff frequency (i.e., the storage capacity at which the read signal has almost no amplitude) corresponds to approximately 31 GB in a BD. When the frequency of the read signal representing the shortest mark comes close to, or exceeds, the OTF cutoff frequency, the limit of optical resolution may have been reached or even surpassed for the laser beam. As a result, the read signal comes to have decreased amplitude and the SNR drops steeply.

That is why the high storage density optical disc shown in FIG. 13(b) would have its storage linear density defined by the frequency of the read signal representing the shortest mark, which may be in the vicinity of the OTF cutoff frequency (i.e., it is lower than, but not significantly lower than, the OTF cutoff frequency) or higher than the OTF cutoff frequency.

Figure 16:
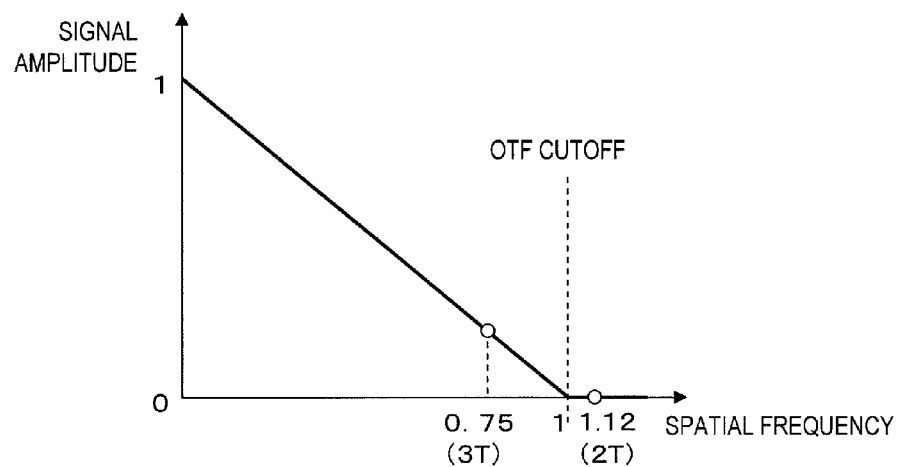
FIG. 16 shows an example in a preferred embodiment of the present invention in which the spatial frequency of the shortest mark (2T) is higher than an OTF cutoff frequency and in which a 2T read signal has an amplitude of zero.

FIG. 16 is a graph showing how the signal amplitude changes with the spatial frequency in a situation where the spatial frequency of the shortest mark (2T) is higher than the OTF cutoff frequency and where the 2T read signal has zero amplitude. In FIG. 16, the spatial frequency of the shortest mark 2T is 1.12 times as high as the OTF cutoff frequency.

<Relation Between Wavelength, NA and Mark Length>

An optical disc B with high storage density needs to satisfy the following relation between the wavelength, the numerical aperture, and the mark/space lengths.

Supposing the shortest mark length is TM nm and the shortest space length is TS nm, the sum P of the shortest mark length and the shortest space length is (TM+TS) nm. In the case of 17 modulation, P=2T+2T=4T. Using the three parameters of the wavelength $\lambda$ of the laser beam (which is 405 nm±5 nm, i.e., in the range of 400 nm to 410 nm), the numerical aperture NA (which is 0.85±0.01, i.e., in the range of 0.84 to 0.86) and the sum P of the shortest mark length and the shortest space length (where P=2T+2T=4T in the case of 17 modulation, in which the shortest length is 2T), if the unit length T decreases to the point that the inequality $$P \leq \lambda/2NA$$

is satisfied, then the spatial frequency of the shortest mark exceeds the OTF cutoff frequency.

If NA=0.85 and $\lambda$=405, then the unit length T corresponding to the OTF cutoff frequency is calculated by $$T=405/(2\times 0.85)/4=59.558 \text{ nm}$$

(Conversely, if $P>\lambda/2NA$ is satisfied, then the spatial frequency of the shortest mark becomes lower than the OTF cutoff frequency).

As can be seen easily, just by increasing the storage linear density, the SNR would decrease due to the limit of optical resolution. That is why if the number of information recording layers per disc were increased excessively, then the decrease in SNR might be an impermissible degree, considering the system margin. Particularly around a point where the frequency of the shortest recording mark exceeds the OTF cutoff frequency, the SNR will start to decrease steeply.

In the foregoing description, the storage density has been described by comparing the frequency of the read signal representing the shortest mark to the OTF cutoff frequency. However, if the storage density of BDs is further increased, then the storage density (and the storage linear density and the storage capacity) can be defined based on the same principle as what has just been described by reference to the relation between the frequency of the read signal representing the second shortest mark (or the third shortest mark or an even shorter recording mark) and the OTF cutoff frequency.

<Storage Density and Number of Layers>

A BD, of which the specifications include a wavelength of 405 m and a numerical aperture of 0.85, may have one of the following storage capacities per layer. Specifically, if the spatial frequency of the shortest marks is in the vicinity of the OTF cutoff frequency, the storage capacity could be approximately equal to or higher than 29 GB (such as 29.0 GB±0.5 GB or 29 GB±1 GB), approximately equal to or higher than 30 GB (such as 30.0 GB±0.5 GB or 30 GB±1 GB), approximately equal to or higher than 31 GB (such as 31.0 GB±0.5 GB or 31 GB±1 GB), or approximately equal to or higher than 32 GB (such as 32.0 GB±0.5 GB or 32 GB±1 GB).

On the other hand, if the spatial frequency of the shortest marks is equal to or higher than the OTF cutoff frequency, the storage capacity per layer could be approximately equal to or higher than 32 GB (such as 32.0 GB±0.5 GB or 32 GB±1 GB), approximately equal to or higher than 33 GB (such as 33.0 GB±0.5 GB or 33 GB±1 GB), approximately equal to or higher than 33.3 GB (such as 33.3 GB±0.5 GB or 33.3 GB±1 GB), approximately equal to or higher than 33.4 GB (such as 33.4 GB±0.5 GB or 33.4 GB±1 GB), approximately equal to or higher than 34 GB (such as 34.0 GB±0.5 GB or 34 GB±1 GB) or approximately equal to or higher than 35 GB (such as 35.0 GB±0.5 GB or 35 GB±1 GB).

In this case, if the storage density per layer is 33.3 GB, an overall storage capacity of approximately 100 GB (more exactly, 99.9 GB) is realized by the three recording layers combined. On the other hand, if the storage density per layer is 33.4 GB, an overall storage capacity that is more than 100 GB (more exactly, 100.2 GB) is realized by the three recording layers combined. Such a storage capacity is almost equal to the capacity in a situation where four recording layers, each having a storage density of 25 GB, are provided for a single BD. For example, if the storage density per layer is 33 GB, the overall storage capacity is 33×3=99 GB, which is just 1 GB (or less) smaller than 100 GB. On the other hand, if the storage density per layer is 34 GB, the overall storage capacity is 34×3=102 GB, which is 2 GB (or less) larger than 100 GB. Furthermore, if the storage density per layer is 33.3 GB, the overall storage capacity is 33.3×3=99.9 GB, which is only 0.1 GB (or less) smaller than 100 GB. And if the storage density per layer is 33.4 GB, the overall storage capacity is 33.4×3=100.2 GB, which is just 0.2 GB (or less) larger than 100 GB.

It should be noted that if the storage density were increased significantly, then it would be difficult to perform a read operation accurately because the shortest marks should be read under rather severe conditions. That is why a realistic storage density that would realize an overall storage capacity of 100 GB or more without increasing the storage density too much would be approximately 33.4 GB per layer.

In this case, the optical disc may have either a four-layer structure with a storage density of 25 GB per layer or a three-layer structure with a storage density of 33-34 GB per layer. If the number of recording layers stacked in a disc is increased, however, the read signal obtained from each of those layers will have decreased amplitude (or a decreased SNR) and stray light will also be produced from those layers (i.e., the read signal obtained from each recording layer will be affected by a signal obtained from an adjacent layer). For that reason, if a three-layer disc with a storage density of 33-34 GB per layer is adopted instead of a four-layer disc with a storage density of 25 GB per layer, then an overall storage capacity of approximately 100 GB will be realized by the smaller number of layers (i.e., three instead of four) with the influence of such stray light minimized. That is why a disc manufacturer who'd like to realize an overall storage capacity of approximately 100 GB while minimizing the number of recording layers stacked would prefer a three-layer disc with a storage density of 33-34 GB per layer. On the other hand, a disc manufacturer who'd like to realize an overall storage capacity of approximately 100 GB using the conventional format as it is (i.e., a storage density of 25 GB per layer) could choose a four-layer disc with a storage density of 25 GB per layer. In this manner, manufacturers with different needs could achieve their goals using mutually different structures, and, and therefore, are afforded an increased degree of flexibility in disc design.

Alternatively, if the storage density per layer is in the 30-32 GB range, the overall storage capacity of a three-layer disc will be short of 100 GB (i.e., approximately 90-96 GB) but that of a four-layer disc will be 120 GB or more. Among other things, if the storage density per layer is approximately 32 GB, a four-layer disc will have an overall storage capacity of approximately 128 GB, which is the seventh power of two that would be processed easily and conveniently by a computer. On top of that, compared to the overall storage capacity of approximately 100 GB realized by a three-layer disc, even shortest marks could also be read under less severe conditions.

That is why when the storage density needs to be increased, a number of different storage densities per layer (such as approximately 32 GB and approximately 33.4 GB) are preferably offered as multiple options so that a disc manufacturer can design a disc more flexibly by adopting one of those multiple storage densities and any number of recording layers in an arbitrary combination. For example, a manufacturer who'd like to increase the overall storage capacity while minimizing the influence of multiple layers stacked is offered an option of making a three-layer disc with an overall storage capacity of approximately 100 GB by stacking three recording layers with a storage density of 33-34 GB per layer. On the other hand, a manufacturer who'd like to increase the overall storage capacity while minimizing the impact on read performance is offered an option of making a four-layer disc with an overall storage capacity of approximately 120 GB or more by stacking four recording layers with a storage density of 30-32 GB per layer.

As described above, an information recording medium according to the present invention is a multilayer information recording medium including a number of information recording layers on which information is stored. At least one of those information recording layers uses different readout power to read information than the other information recording layers. And a base thickness between each pair of adjacent ones of the information recording layers is equal to or greater than a predetermined thickness.

In one preferred embodiment, the base thickness is a thickness at which the intensity of light decreases to a predefined degree or more due to aberration.

Another information recording medium according to the present invention includes at least three information recording layers. If the readout power of a laser beam in reading information from an $n^{th}$ one $L(n)$ (where n is an integer that is equal to or greater than zero) of the information recording layers, which are counted sequentially from one of the information recording layers that is located most distant from the data side of the information recording medium, is identified by $Pw(n)$, and if the readout power of the laser beam in reading information from an $(n+a)^{th}$ one $L(n+a)$ of the information recording layers is identified by $Pw(n+a)$ (where a is an integer that satisfies $n+a \geq 0$ and $a \neq 0$), then a base thickness between each pair of adjacent ones of the information recording layers is determined so that the intensity of the light when the information recording layer $L(n+a)$ is irradiated with a laser beam having the readout power $Pw(n)$ becomes equal to or lower than that of the light when the information recording layer $L(n+a)$ is irradiated with a laser beam having the readout power $Pw(n+a)$.

Still another information recording medium according to the present invention includes at least three information recording layers. If the readout power of a laser beam in reading information from an $n^{th}$ one $L(n)$ (where n is an integer that is equal to or greater than zero) of the information recording layers, which are counted sequentially from one of the information recording layers that is located most distant from the data side of the information recording medium, is identified by $Pw(n)$, and if the readout power of the laser beam in reading information from an $(n+a)^{th}$ one $L(n+a)$ of the information recording layers is identified by $Pw(n+a)$ (where a is an integer that satisfies $n+a \geq 0$ and $a \neq 0$), and if the base thickness between the information recording layers $L(n)$ and $L(n+a)$ is identified by D, then the information recording medium satisfies $$100 \times Pw(n)/Pw(n+a) \geq -0.1238 \times D^2 - 2.772 \times D + 106.56,$$
$$\text{and } Pw(n) \leq Pw(n+a).$$

A reading method according to the present invention is a method for reading information from the information recording medium described above. The method includes the steps of: irradiating the information recording layer $L(n)$ with a laser beam having the readout power $Pw(n)$ in reading information from the information recording layer $L(n)$; and irradiating the information recording layer $L(n+a)$ with a laser beam having the readout power $Pw(n+a)$ in reading information from the information recording layer $L(n+a)$.

A reading apparatus according to the present invention is an apparatus for reading information from the information recording medium described above. The apparatus includes an irradiating section for irradiating the information recording medium with a laser beam. The irradiating section irradiates the information recording layer $L(n)$ with a laser beam having the readout power $Pw(n)$ in reading information from the information recording layer $L(n)$. The irradiating section irradiates the information recording layer $L(n+a)$ with a laser beam having the readout power $Pw(n+a)$ in reading information from the information recording layer $L(n+a)$.

An information recording medium making method according to the present invention is a method of making an information recording medium with k information recording layers (where k is an integer that is equal to or greater than three). The method includes the steps of: forming the k information recording layers, from which information is retrievable using a laser beam with a wavelength of 400 nm to 410 nm through an objective lens with a numerical aperture of 0.84 to 0.86, on a substrate with a thickness of 1.1 mm; forming (k−1) spacer layers between the information recording layers; and forming a protective coating with a thickness of 0.1 mm or less on the $k^{th}$ one of the information recording layers as counted from the substrate. The step of forming information recording layers includes: making either concentric or spiral tracks on one of two groups of the information recording layers that are either odd-numbered or even-numbered as counted from the substrate so that the laser beam scans that group of information recording layers from some outer radial location on the information recording medium toward the inner edge thereof; and making either concentric or spiral tracks on the other group of the information recording layers that are either even-numbered or odd-numbered so that the laser beam scans that group of information recording layers from some inner radial location on the information recording medium toward the outer edge thereof. If the readout power of the laser beam in reading information from an $n^{th}$ one $L(n)$ (where n is an integer that is equal to or greater than zero) of the information recording layers, which are counted sequentially from one of the information recording layers that is located most distant from the data side of the information recording medium, is identified by $Pw(n)$, and if the readout power of the laser beam in reading information from an $(n+a)^{th}$ one $L(n+a)$ of the information recording layers, which are counted sequentially from the most distant information recording layer from the data side of the information recording medium, is identified by $Pw(n+a)$ (where a is an integer that satisfies $n+a \geq 0$ and $a \neq 0$), and if the base thickness between the information recording layers $L(n)$ and $L(n+a)$ is identified by D, then the information recording medium satisfies $$100 \times Pw(n)/Pw(n+a) \geq -0.1238 \times D^2 - 2.772 \times D + 106.56,$$
$$\text{and } Pw(n) \leq Pw(n+a).$$

An optical recording medium according to the present invention is a multilayer optical recording medium including a number of recording layers on which information is stored. In this recording medium, different readout powers are used for either all, or only some, of its recording layers, and a base thickness between each pair of adjacent recording layers is set to be equal to or greater than a predetermined thickness.

In one preferred embodiment, the base thickness between each pair of recording layers may be a thickness at which the intensity of light decreases to a predefined degree or more due to aberration.

In another preferred embodiment, the base thickness between each pair of recording layers is determined so that if readout power for an $n^{th}$ one $L(n)$ of the recording layers is $Pw(n)$, the intensity of light at an $(n+a)^{th}$ one of the recording layers becomes equal to readout power $Pw(n+a)$ for the $(n+a)^{th}$ layer $L(n+a)$, where n is an integer that is equal to or greater than zero and a is an integer that is equal to or greater than 0−n.

In an alternative preferred embodiment, the base thickness between each pair of recording layers is determined so that if readout power for an $n^{th}$ one $L(n)$ of the recording layers is $Pw(n)$, the intensity of light at an $(n+a)^{th}$ one of the recording layers becomes equal to or lower than readout power $Pw(n+a)$ for the $(n+a)^{th}$ layer $L(n+a)$, where n is an integer that is equal to or greater than zero and a is an integer that is equal to or greater than 0−n.

In a reading method according to the present invention, when a multilayer recording medium including a number of recording layers on which information is stored is scanned, different readout powers are used for either all, or only some, of those recording layers, and readout power for each recording layer is determined based on information about a base thickness between each pair of adjacent ones of the recording layers.

In one preferred embodiment, readout power for each recording layer is determined so that if readout power for an $n^{th}$ one $L(n)$ of the recording layers is $Pw(n)$, the intensity of light at an $(n+a)^{th}$ one of the recording layers becomes equal to readout power $Pw(n+a)$ for the $(n+a)^{th}$ layer $L(n+a)$, where n is an integer that is equal to or greater than zero and a is an integer that is equal to or greater than 0−n.

In an alternative preferred embodiment, readout power for each recording layer is determined so that if readout power for an $n^{th}$ one $L(n)$ of the recording layers is $Pw(n)$, the intensity of light at an $(n+a)^{th}$ one of the recording layers becomes equal to or lower than readout power $Pw(n+a)$ for the $(n+a)^{th}$ layer $L(n+a)$, where n is an integer that is equal to or greater than zero and a is an integer that is equal to or greater than 0−n.

In performing a read operation on a multilayer recording medium including a number of recording layers on which information is stored, a reading apparatus according to the present invention uses different readout powers for either all, or only some, of those recording layers, and determines readout power for each recording layer based on information about a base thickness between each pair of adjacent ones of the recording layers.

In one preferred embodiment, readout power for each recording layer is determined so that if readout power for an $n^{th}$ one $L(n)$ of the recording layers is $Pw(n)$, the intensity of light at an $(n+a)^{th}$ one of the recording layers becomes equal to readout power $Pw(n+a)$ for the $(n+a)^{th}$ layer $L(n+a)$, where n is an integer that is equal to or greater than zero and a is an integer that is equal to or greater than 0−n.

In an alternative preferred embodiment, readout power for each recording layer is determined so that if readout power for an $n^{th}$ one $L(n)$ of the recording layers is $Pw(n)$, the intensity of light at an $(n+a)^{th}$ one of the recording layers becomes equal to or lower than readout power $Pw(n+a)$ for the $(n+a)^{th}$ layer $L(n+a)$, where n is an integer that is equal to or greater than zero and a is an integer that is equal to or greater than 0−n.

INDUSTRIAL APPLICABILITY

Using a recording medium according to the present invention, data stored there will never deteriorate even if an unintentional layer-to-layer jump has happened. That is why such a recording medium can be used particularly effectively in an optical disc system that uses a multilayer recording medium.

REFERENCE SIGNS LIST

L0, L1, L2, L3, L4, L5, L6, L7 recording layer
t0, t1, t2, t3, t4, t5, t6 base thickness between each pair of adjacent ones of the information recording layers
Pw0, Pw1, Pw2, Pw3 readout power
100 recording medium
400 reading apparatus
402 optical pickup
403 semiconductor laser control section
404 servo processing section
405 read signal processing section
406 central processing unit (CPU) section

The invention claimed is:
1. An information recording medium comprising:
at least three information recording layers, and
a base provided between the recording layers,
wherein the thickness (D) of the base between the recording layers satisfies a following condition:

$$100 \times Pw(n)/Pw(n+a) \geq -0.1238 \times D^2 - 2.772 \times D + 106.56,$$
$$\text{where } Pw(n) \leq Pw(n+a),$$

Pw(n) is a readout power of a laser beam in reading information from an $n^{th}$ one $L(n)$ of the information recording layers, which are counted sequentially from one of the information recording layers that is located most distant from the data side of the information recording medium,
Pw(n+a) is a readout power of a laser beam in reading information from an $(n+a)^{th}$ one $L(n+a)$ of the information recording layers,
n is an integer that is equal to or greater than zero, and
a is an integer that satisfies $n+a \geq 0$ and $a \neq 0$.
2. A method for reading information from an information recording medium comprising at least three information recording layers and a base formed between the recording layers, the method comprising the steps of:
reading information from the information recording layer L(n) of the information recording layers, which is counted sequentially from one of the information recording layers that is located most distant from the data side of the information recording medium, by irradiating on the information recording layer L(n) a laser beam having a readout power Pw(n), and reading information from the information recording layer L(n+a) of the information recording layers by irradiating on the information recording layer L(n+a) a laser beam having a readout power Pw(n+a), wherein, relation between a thickness (D) of the base between the recording layer L(n) and layer L(n+a), and the read out power Pw(n) and Pw(n+a) satisfies the following conditions:

$$100 \times Pw(n)/Pw(n+a) \geqq -0.1238 \times D^2 - 2.772 \times D + 106.56,$$
$$\text{and } Pw(n) \leqq Pw(n+a), \text{ where}$$

n is an integer that is equal to or greater than zero, and
a is an integer that satisfies n+a≧0 and a≠0.

3. An apparatus for reading information from an information recording medium comprising at least three information recording layers and a base formed between the recording layers, the apparatus comprising:

a first section for reading information from an information recording layer L(n) of the information recording layers, which is counted sequentially from one of the information recording layers that is located most distant from the data side of the information recording medium, by irradiating on the information recording layer L(n) a laser beam having a readout power Pw(n), and a second section for reading information from the information recording layer L(n+a) of the information recording layers by irradiating on the information recording layer L(n+a) a laser beam having a readout power Pw(n+a), wherein, relation between a thickness (D) of the base between the recording layer L(n) and layer L(n+a), and the read out power Pw(n) and Pw(n+a) satisfies the following conditions:

$$100 \times Pw(n)/Pw(n+a) \geqq 0.1238 \times D^2 - 2.772 \times D + 106.56,$$
$$\text{and } Pw(n) \leqq Pw(n+a), \text{ where}$$

n is an integer that is equal to or greater than zero, and
a is an integer that satisfies n+a≧0 and a≠0.

4. A method of making an information recording medium with k information recording layers (where k is an integer that is equal to or greater than three), the method comprising the steps of:

forming the k information recording layers, from which information is retrievable using a laser beam with a wavelength of 400 nm to 410 nm through an objective lens with a numerical aperture of 0.84 to 0.86, on a substrate with a thickness of 1.1 mm;

forming (k−1) spacer layers between the information recording layers; and forming a protective coating with a thickness of 0.1 mm or less on the $k^{th}$ one of the information recording layers as counted from the substrate, wherein the step of forming information recording layers includes:

making either concentric or spiral tracks on one of two groups of the information recording layers that are either odd-numbered or even-numbered as counted from the substrate so that the laser beam scans that group of information recording layers from outer radial location on the information recording medium toward the inner edge thereof; and making either concentric or spiral tracks on the other group of the information recording layers that are either even-numbered or odd-numbered so that the laser beam scans that group of information recording layers from inner radial location on the information recording medium toward the outer edge thereof, and the thickness (D) of a space layer between the recording layers satisfies the following condition:

$$100 \times Pw(n)/Pw(n+a) \geqq -0.1238 \times D^2 - 2.772 \times D + 106.56,$$
$$\text{where } Pw(n) \leqq Pw(n+a),$$

Pw(n) is a readout power of a laser beam in reading information from an $n^{th}$ one L(n) of the information recording layers, which are counted sequentially from one of the information recording layers that is located most distant from the data side of the information recording medium, Pw(n+a) is a readout power of a laser beam in reading information from an $(n+a)^{th}$ one L(n+a) of the information recording layers, n is an integer that is equal to or greater than zero, and
a is an integer that satisfies n+a≧0 and a≠0.

* * * * *

UNITED STATES PATENT AND TRADEMARK OFFICE
CERTIFICATE OF CORRECTION

PATENT NO. : 8,144,563 B2  
APPLICATION NO. : 12/936939  
DATED : March 27, 2012  
INVENTOR(S) : Masahito Nakao et al.

Page 1 of 1

It is certified that error appears in the above-identified patent and that said Letters Patent is hereby corrected as shown below:

IN THE CLAIMS:

Column 23, line 37, Claim 3, "$100 \times Pw(n)/Pw(n+a) \geq 0.1238 \times D^2 - 2.772 \times D + 106.56$"
should read,
-- $100 \times Pw(n)/Pw(n+a) \geq -0.1238 \times D^2 - 2.772 \times D + 106.56$ --.

Signed and Sealed this
Third Day of July, 2012

David J. Kappos
*Director of the United States Patent and Trademark Office*